(12) United States Patent
Ghazal et al.

(10) Patent No.: US 12,487,943 B2
(45) Date of Patent: Dec. 2, 2025

(54) SYSTEMS AND METHODS FOR BIRTH TIME-BASED FIFO CACHE REAPING

(71) Applicant: RELATIVITY ODA LLC, Chicago, IL (US)

(72) Inventors: Mohammad Amer Ghazal, Chicago, IL (US); Ankit Khandelwal, Chicago, IL (US); Steven Engelhardt, Chicago, IL (US)

(73) Assignee: RELATIVITY ODA LLC, Chicago, IL (US)

( * ) Notice: Subject to any disclaimer, the term of this patent is extended or adjusted under 35 U.S.C. 154(b) by 0 days.

(21) Appl. No.: 18/598,134

(22) Filed: Mar. 7, 2024

(65) Prior Publication Data

US 2025/0217304 A1 Jul. 3, 2025

Related U.S. Application Data

(60) Provisional application No. 63/616,025, filed on Dec. 29, 2023.

(51) Int. Cl.
*G06F 12/128* (2016.01)
*G06F 12/0891* (2016.01)
*G06F 16/178* (2019.01)

(52) U.S. Cl.
CPC ........ *G06F 12/128* (2013.01); *G06F 12/0891* (2013.01); *G06F 16/178* (2019.01)

(58) Field of Classification Search
CPC ... G06F 12/0891; G06F 12/128; G06F 16/178
See application file for complete search history.

(56) References Cited

U.S. PATENT DOCUMENTS

| | | | |
|---|---|---|---|
| 2004/0193819 A1* | 9/2004 | Marinescu | G06F 12/0253 711/E12.009 |
| 2011/0010496 A1* | 1/2011 | Kirstenpfad | G06F 12/02 711/E12.001 |
| 2015/0248419 A1* | 9/2015 | Motoyoama | G06F 16/125 726/1 |
| 2019/0043540 A1* | 2/2019 | Chagam Reddy | G06F 12/0246 |
| 2019/0057101 A1* | 2/2019 | Esserlieu | G06F 3/0604 |
| 2022/0075731 A1* | 3/2022 | Dong | G06F 12/123 |
| 2023/0125574 A1* | 4/2023 | Gunda | G06F 3/067 707/813 |

* cited by examiner

*Primary Examiner* — Aracelis Ruiz
(74) *Attorney, Agent, or Firm* — MARSHALL, GERSTEIN & BORUN LLP; Randall G. Rueth

(57) ABSTRACT

Techniques for birth time-based first in, first out (FIFO) cache reaping are provided. A method includes obtaining an object to be stored in a cache; storing the object in the cache such that the object is associated with a birth time at which the storage occurred, wherein the birth time is constant as changes to the object are synchronized to the cache; calculating a cache storage time for the object based on the birth time for the object; determining that the cache storage time for the object exceeds a maximum cache storage threshold; and responsive to the determination, flagging the object for deletion from the cache.

18 Claims, 4 Drawing Sheets

SYSTEMS AND METHODS FOR BIRTH TIME-BASED FIFO CACHE REAPING

CROSS-REFERENCE TO RELATED APPLICATIONS

This application claims priority to and the filing date of provisional U.S. Patent Application No. 63/616,025 entitled "SYSTEMS AND METHODS FOR BIRTH TIME-BASED FIFO CACHE REAPING," filed on Dec. 29, 2023, the entire contents of which is hereby expressly incorporated herein by reference.

FIELD OF THE DISCLOSURE

The present disclosure relates generally to cache management, and more particularly to birth time for first in, first out (FIFO) cache reaping.

BACKGROUND

When providing software services to customers, the customer data is typically maintained at a cloud storage system. This enables the service provider to readily scale the amount of storage provided based upon customer demand. However, interfacing with data stored in the cloud storage system is typically slower than if the customer data was maintained in an on-premises solution due to the need to interface with an external storage system. As a result, when the software service needs to interact with the customer data, the software service typically interacts with a copy of the customer data maintained at a local cache. Because this cache is local to the software service, the software service is able to execute tasks that interact with the customer data in a quicker manner.

Enforcing changes to security permissions is problematic for locally cached data. If a person or group's permission to access an object is revoked at the cloud storage system, the cloud storage system may be unable to enforce access revocation in the local cache. However, with a conventional cache reaping system based upon last modification and/or created time, a frequently accessed and/or modified object may remain in the local cache for long periods of time. Thus, conventional caching techniques may struggle to enforce security policy updates.

In view of the foregoing challenges, there is a need for systems and methods of birth time-based FIFO cache reaping.

BRIEF SUMMARY

The following relates to birth time FIFO cache reaping. A service provider may provide a remote, cloud-based long-term storage (LTS) system and a local cache located at a customer premises. When a customer accesses an object from the LTS system, the object may be temporarily saved in the local cache. The time at which the object is cached—the "birth time"—may be recorded in cache metadata. The birth time may be used to determine a cache storage time. Objects having cache storage times longer than a specified threshold may be flagged for deletion from the local cache.

In one embodiment, a computer-implemented method for cache management is provided. The method includes (1) obtaining an object to be stored in a cache; (2) storing the object in the cache such that the object is associated with a birth time at which the storage occurred, wherein the birth time is constant as changes to the object are synchronized to the cache; (3) calculating a cache storage time for the object based on the birth time for the object; (4) determining that the cache storage time for the object exceeds a maximum cache storage threshold; and (5) responsive to the determination, flagging the object for deletion from the cache.

In another embodiment, a system for predictive cache management is provided. The system includes (i) a cache; (ii) one or more processors; and (iii) one or more non-transitory memories coupled to the one or more processors and storing instructions that when executed by the one or more processors, cause the one or more processors to (1) obtain an object to be stored in the cache; (2) store the object in the cache such that the object is associated with a birth time at which the storage occurred, wherein the birth time is constant as changes to the object are synchronized to the cache; (3) calculate a cache storage time for the object based on the birth time for the object; (4) determine that the cache storage time for the object exceeds a maximum cache storage threshold; and (5) responsive to the determination, flag the object for deletion from the cache.

The birth time FIFO cache reaping systems and methods disclosed provide security improvements to caching systems. Cached objects are flagged for deletion, regardless of access frequency, after their storage time exceeds a specified threshold. Thus, if permissions to access an object are changed or revoked, the permission change or revocation take effect sooner by deleting the object from the cache more quickly.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Additional, alternate and/or fewer actions, steps, features and/or functionality may be included in an aspect and/or embodiments, including those described elsewhere herein. Accordingly, the drawings and description are to be regarded as illustrative in nature and not as restrictive.

DETAILED DESCRIPTION

I. Overview

Figure 1:
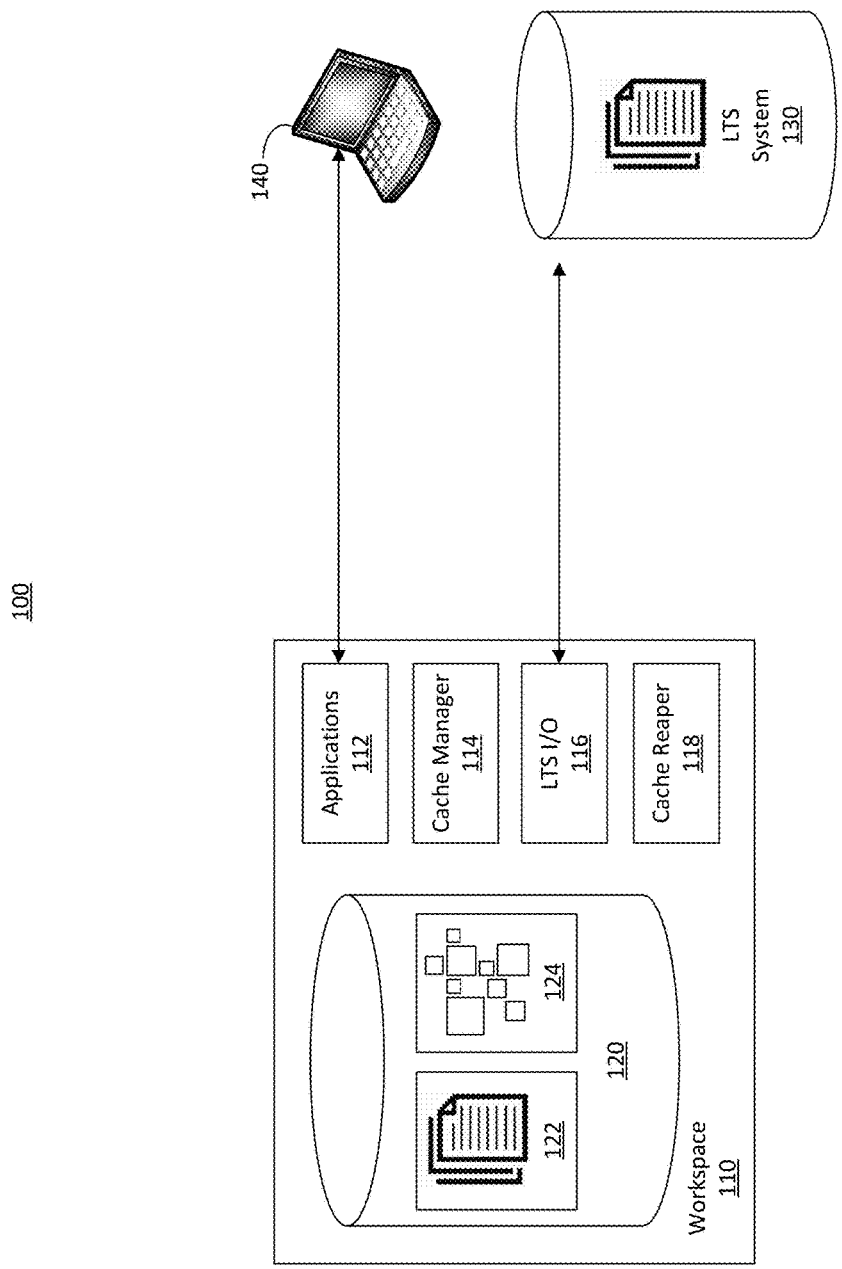
FIG. 1 illustrates an example environment that may be used to implement the techniques for birth time FIFO-based cache management, according to an embodiment.

The present techniques relate to birth time-based FIFO reaping of objects in a cache. As it is generally used herein, the term "birth time" refers to the time an object enters a cache. It should be appreciated that as additional versions of the object are saved to the cache, for example, in response to an application interacting with the object, the birth time remains static. That is, each version of the object is associated with the same birth time as when the original version of the object first entered the cache. As a result, a birth rate-based FIFO reaping system will maintain the same FIFO ordering for the objects regardless of any user interaction with the object after the object has entered the cache.

As it is generally used herein, an object refers to any type of data that can be represented by a software object (e.g., a directory, a document file, a document fragment, a metadata file, an unstructured data file, and/or other data types). In some cases, the "object" is a "document." For example, a document may be a Microsoft Word file, a text file, an email, a pdf, a presentation, a spreadsheet, an image, a messaging file format, an audio file, and/or other documents. The term "document" may refer to either the document file (e.g., a .doc or .txt file) or a corresponding object(s) from which the document (or a portion thereof) can be derived. In other cases, the "object" is a directory that includes a plurality of directory entries, e.g., files.

Generally, there are two main operations performed by local software systems with respect to objects maintained at the cloud storage system—(1) read operations where an object is obtained from the cloud storage system, and (2) write operations where new objects are written to the cloud storage system or changes to existing objects at the cloud storage system are propagated to the copy maintained thereat. For read operations, the objects obtained from cloud storage system are stored in a local cache where applications supported by the software system can quickly interface with the object. For example, the objects read into the cache may be presented for display by a user interface application, processed by a data processing application, such as an OCR processing application or a PDF converter, or other operations supported by the software system.

For write operations, the cache may also serve as a staging area where objects (and/or changes thereto) are stored until they have been successfully written to the cloud storage system. As one example, an object collection application may detect that a user uploaded a set of objects to a workspace. Accordingly, the cache may be configured to store the collected object while they are being written to the cloud storage system. As another example particular to a review process, a reviewer may have made one or more coding decisions with respect to an assigned batch of objects. Accordingly, the copies of the objects read into the cache are updated to reflect the coding decisions of the reviewer. Thus, the cache may store the updated copies of the objects that are to be written back to the cloud storage system.

II. Example Computing Environment

FIG. 1 depicts an example data storage environment 100 that may be used to implement the disclosed birth time FIFO cache reaping techniques. As illustrated, the environment 100 includes one or more workspaces 110, long-term storage (LTS) systems 130, and client computers 140.

A workspace 110 may include a plurality of software modules that implement the disclosed techniques. Generally, the workspace 110 is client- and/or user-specific software environment that enables users to interface with their data maintained within the workspace. In some embodiments, the workspace 110 may be hosted on one or more virtual machines instantiated in a cloud computing environment or an on-premises deployment of servers. Accordingly, the modules of the workspace 110 may be instantiated across any number of different physical computing units that include respective sets of one or more processors (e.g., one or more microprocessors, one or more CPUs, one or more GPUs, etc.).

More specifically, the software modules that are included in the workspace 110 may be instantiated by one or more processors configured to execute software instructions stored in one or more memories of the physical memory (e.g., stored in a persistent memory such as a hard drive or solid-state memory). It should be appreciated that certain instructions may be more efficiently executed by different types of processors. Accordingly, the processors that instantiate the various components of the workspace 110 may be configured to execute different instructions using the different processor types. In some embodiments, the workspace 110 may include multiple instantiated copies of any of the components therein to perform the disclosed functionality in parallel with one another.

As illustrated, the workspace includes a cache 120. The cache 120 may implement any storage type, including ephemeral storage, permanent storage, and/or combinations thereof. The cache 120 may include separate storage for the objects and the metadata. In the illustrated example, the cache 120 includes an object storage 122 and a metadata storage 124. In some embodiments, the object storage 122 may be associated with a file system that includes a hierarchy of folders of one or more objects. The object storage 122 may comprise a subset of the objects maintained at the LTS system 130. The cache metadata storage 124 may be a separate data store for storing metadata regarding the objects in the object storage 122. In some aspects, the metadata in the metadata storage 124 may include an object identifier associated with the object to which the metadata corresponds. In some aspects, the metadata in the metadata storage 124 may include a birth time, a last modified time, a delete flag, and/or a write flag, and/or any other type of object metadata. It should be appreciated that while FIG. 1 depicts the object storage 122 and the metadata storage 124 as part of the cache 120, in other embodiments, the object storage 122 and the metadata storage 124 are maintained at separate data stores.

As illustrated, the workspace 110 includes one or more applications 112. The applications 112 may comprise instructions allowing the workspace 110 to interface with the client devices 140. The applications 112 may include client-server and/or web-based applications via which a user interfaces with objects via a client device 140. The applications 112 may receive requests from the client device 140 to access one or more objects. The applications 112 may transmit a copy or a view of the one or more objects to the client device 140 in response to the request. The applications 112 may communicate with the client device via HTTPS or any other suitable protocol.

The cache manager module 114 may comprise instructions for interfacing with the cache 120. The cache manager module 114 may create, modify, retrieve, synchronize, and/or delete one or more objects stored in the object storage 122. The cache manager module 114 may generate and/or modify one or more metadata fields in the metadata storage 124. The cache manager module 114 may determine whether a requested object exists in the object storage 122. The cache manager module 114 may determine whether an object in the object storage 122 exceeds a maximum storage time. If so, the cache manager module 114 may then flag the object for deletion and/or delete the object.

The LTS I/O module 116 may comprise instructions allowing the workspace 110 to interface with the LTS system 130. The LTS I/O module 116 may retrieve one or more objects and/or folders from the LTS system 130. The LTS I/O module 116 may transmit one or more objects, folders, and/or modifications to objects or folders to the LTS system

130. The LTS I/O module 116 may communicate with may interface with the LTS system 130 via HTTPS, SAMBA, Server Message Block (SMB), Common Internet File System (CIFS), or any other suitable protocol.

The cache reaper module 118 may comprise instructions for parsing and flagging objects in the cache 120. The cache reaper module 118 may iterate through all or a subset of objects in cached object system 122. For each iterated object, the cache reaper module 118 may flag an object for deletion and/or delete the object if the object has been stored in the cache for longer than a specified time. For the objects flagged for deletion, the cache reaper module 118 may determine whether there are any pending writes to synchronize with the LTS 130. If there are, the cache reaper module 118 may add a corresponding write command to a queue of changes to synchronize with the LTS 130.

The LTS system 130 may comprise an individual server, a group of multiple servers, cloud-based system or another suitable type of computing device or system. The LTS system 130 may be located within a server provider's premises or hosted by a third-party provider. The LTS system 130 may comprise a hierarchy of folders. Each folder may comprise one or more objects.

Generally speaking, the workspace 110 may facilitate the processing of objects. For instance, one or more folders comprising one or more objects may be first retrieved from the LTS system 130 to the workspace 110. Subsequently, objects may be selectively accessed by a client computer 140 via the applications 112 for processing (e.g., to highlight, redact, analyze, select a set of objects for batch review, etc.).

The client computer 140 may comprise any suitable computing device operated by a user affiliated with a customer. For example, the client computer 140 may include one or more servers, personal computers, smartphones, tablets, or any other suitable computing device. The client computer 140 may interface with the application 1124 over the via a web browser, a dedicated client application, or any other suitable application using HTTPS or any other suitable protocol. The client computer 140 may permit a user to create, review, comment, annotate, and/or modify one or more objects via the application 112.

Figure 2:
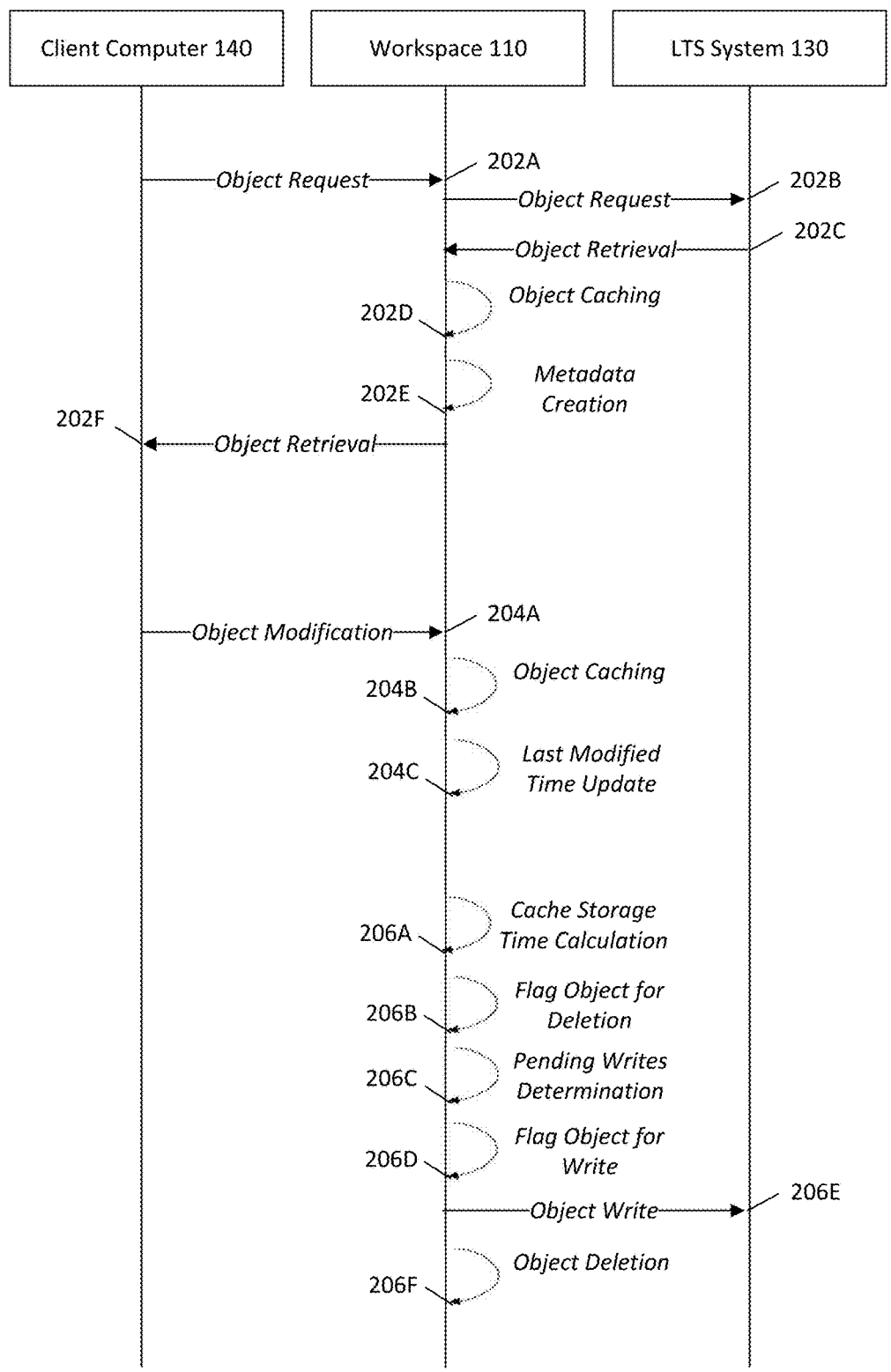
FIG. 2 illustrates example workflows that interact with a cache managed in accordance with the disclosed birth time FIFO-based cache management techniques.

III. Example Sequences of Object Requests, Retrieval, Caching, Modification, and Reaping FIG. 2 depicts an exemplary sequence diagram 200 associated with processing object requests, retrieval, caching, modification, and reaping (including birth time-based FIFO reaping). The sequence diagram 200 includes a timeline of events affecting the client computer 140, workspace 110, and LTS system 130. Not all steps illustrated in the sequence diagram 200 are mandatory, and the steps may be performed in an order different from what is depicted.

Steps 202A-202F illustrate a request, retrieval, and caching of an object. At step 202A, a user at the client computer 140 transmits a request for an object to an application 112. The cache manager 114 determines whether the requested object is stored in the cache 120. In the scenario associated with the sequence diagram 200, the object is not stored in the cache 120. Thus, at step 202B, the LTS I/O module 116 submits an object request (e.g., a fetch command) to the LTS system 130. At step 202C, the LTS system 130 returns the object to the LTS I/O module 116. At step 202D, the cache manager 114 stores the retrieved object in the cache 120. As part of the store operation, the cache manager 114 may also create metadata associated with the object at step 202E. In some aspects, the metadata may include a birth time and/or a last modified time. The cache manager 114 may store the metadata in any appropriate manner associated. For example, the cache manager 114 may store the metadata in the metadata storage 124, at a separate metadata data store, in the object itself, and so on. At step 202F, the application 112 provides the object to the to the client computer 140.

Steps 204A-204C illustrate a modification of the cached object. At step 204A, the user at the client computer 140 modifies the object, which may include making changes via the application 112. At step 204B, the cache manager 114 saves the modified object to cache 120. The cache manager 114 at step 204C updates the last modified time to the time at which the modified object was saved into cache 120.

It should be appreciated that in some systems, the cache manager 114 saves the modifications to the object as a new object in the cache 120. In these systems, when the new object is created, the cache manager 114 may assign the new object the birth time from the parent object to maintain the birth time across each version of the object in the cache 120. Accordingly, for these objects, the "birth time" and the "created on" times may be different times.

Steps 206A-206F illustrate the birth time-based FIFO reaping process. The birth time-based FIFO reaping process may occur periodically, e.g., every 24 hours, and at a specified time, e.g., after normal business hours during periods of low activity. Alternatively, birth time-based FIFO reaping process may occur during periods of low cache input/output activity, e.g., the CPU and/or memory utilization below a specified amount, the number of active sessions below a specified number, etc. The birth time-based FIFO reaping process may analyze all or a subset of the plurality of objects stored in the cached object system 122. At step 206A, the cache manager 114 calculates a cache storage time for the object by subtracting the birth time from the current time, i.e., the time at which the cache manager 114 analyzes the object. The cache manager 114 then compares the cache storage time for the object to a maximum cache storage duration. In some aspects, the maximum cache storage duration is a configurable setting that indicates a duration an object may be stored in cache, such as 1 day, 2 days, 3 days, 4 days, 5 days, 6 days, 7 days, etc., before the object is subject to eviction from the cache 120. If the cache manager 114 determines that the cache storage time does not exceed the maximum cache storage duration, then the cache manager 114 moves on to the next object. Otherwise, if the cache storage time exceeds the maximum cache storage duration, then the cache manager 114 flags the object for deletion from the cache 120 at step 206B.

At step 206C, if the object has been flagged for deletion, then the cache manager 114 determines whether the object is associated with any pending writes to the LTS system 130. In some aspects, the determination may be based upon a "dirty" or "write" flag set when a user made modification to the cached object. In some aspects, the determination may be based upon comparing the last modified time for the cached object to a last modified time for the object in the LTS system 130. If the cache manager 114 determines that the object has pending writes, then the writes are queued for synchronization with the LTS 130 at step 206D. At step 206E, the LTS I/O module 116 pushes the pending writes queued for writing to the LTS system 130. At step 206F, the cache reaper 118 deletes the object from the cache 120. In some aspects, the cache reaper 118 additionally deletes metadata associated with the object.

IV. Example Cache Reaping Environment

Figure 3:
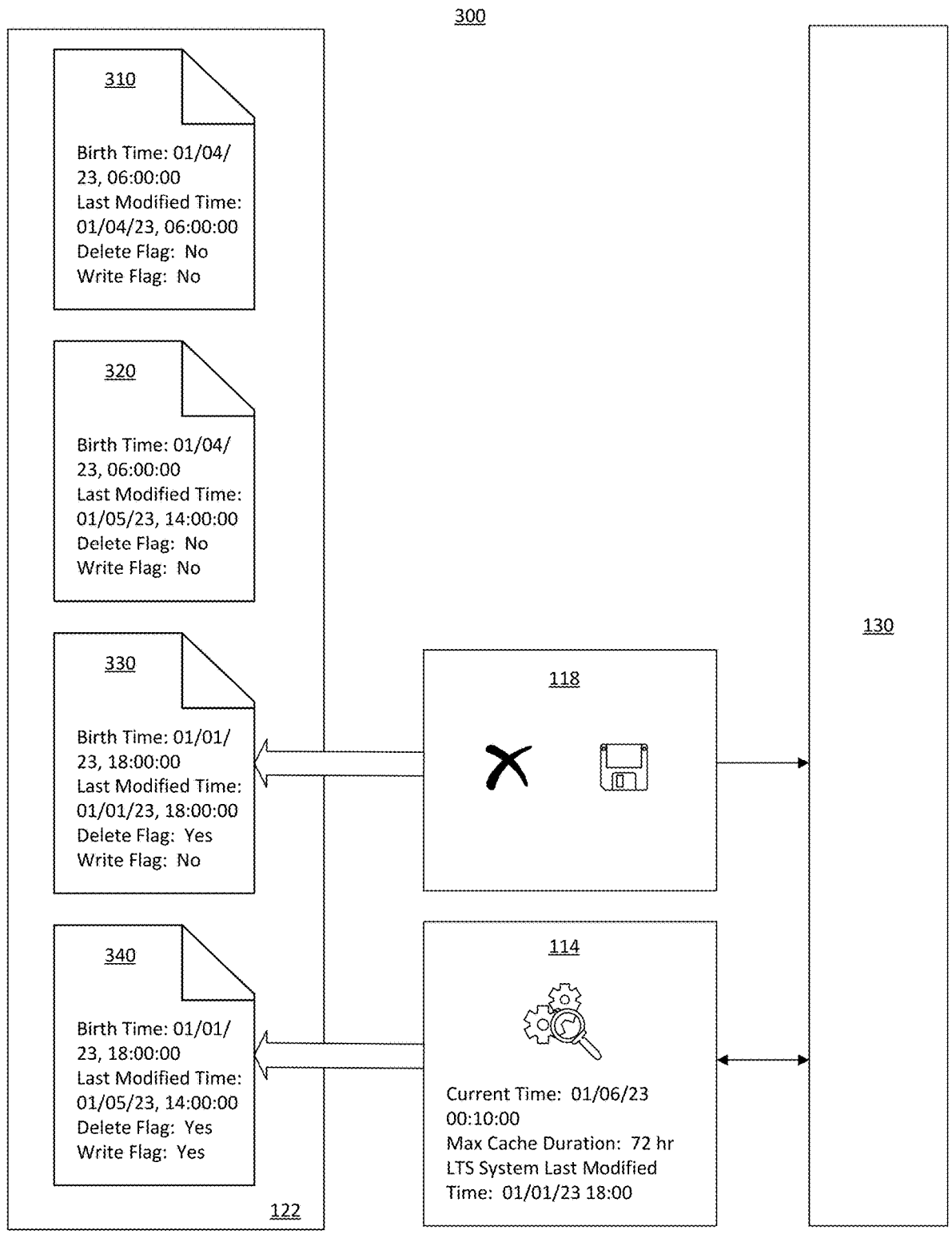
FIG. 3 illustrates an example workflow profiler, in accordance with an embodiment.

FIG. 3 depicts an example cache reaping environment 300 illustrating the disclosed birth time-based FIFO cache reaping techniques. As illustrated, the environment 300 includes the object storage 122, the cache manager module 114, the cache reaper module 118, and LTS system 130.

The object storage 122 comprises a plurality of objects, including objects 310, 320, 330, and 340. In one aspect, objects 310, 320, 330, and 340 comprise object metadata, such as birth time, last modified time, delete flag, and/or write flag. In other aspects, the metadata 124 may comprise the illustrated object metadata.

The cache manager 114 may iterate through all or a subset of the objects in the cached object system 122 to determine which objects should be reaped. The cache manager 114 may read and/or modify the object metadata as part of making the reaping decision. The cache manager 114 may determine a current time and a maximum cache storage duration from the workspace 110.

The cache manager 114 may analyze object 310 by calculating a cache storage duration for the object. The cache manager 114 may determine whether the cache storage duration is less than the maximum cache storage duration. If the cache storage duration is less than the maximum cache storage duration, the cache manager 114 may proceed to the next object (the object 320) in the object storage 122.

The cache manager 114 may analyze object 320 in a similar manner to the object 310. The object 320's write flag remains "No" despite the last modified time being later than the birth time (and possibly later than the file system last modified time) because the cache storage duration is less than the maximum cache storage duration.

The cache manager 114 may analyze object 330 in a similar manner to the object 310. Unlike the object 310, the cache storage duration is greater than the maximum cache storage duration for the object 330. Thus, the cache manager 114 may set the delete flag to "Yes."

The cache manager 114 may analyze object 340 in a similar manner to the object 310. Similar to the object 330 the cache storage duration is greater than the maximum cache storage duration. Thus, the cache manager 114 may set the delete flag to "Yes."

The cache reaper 118 may iterate through the objects that have the delete flag set to Yes. For object 330, the delete flag is Yes and the write flag is No. Thus, the cache reaper 118 may delete object 330 from the cache 120. For object 340, the delete flag is Yes and the write flag is Yes. Thus, the LTS I/O module 118 may upload object 340 to the LTS system 130, and the cache reaper 118 may then delete object 340 from the cache 120.

V. Example Flow Diagram

Figure 4:
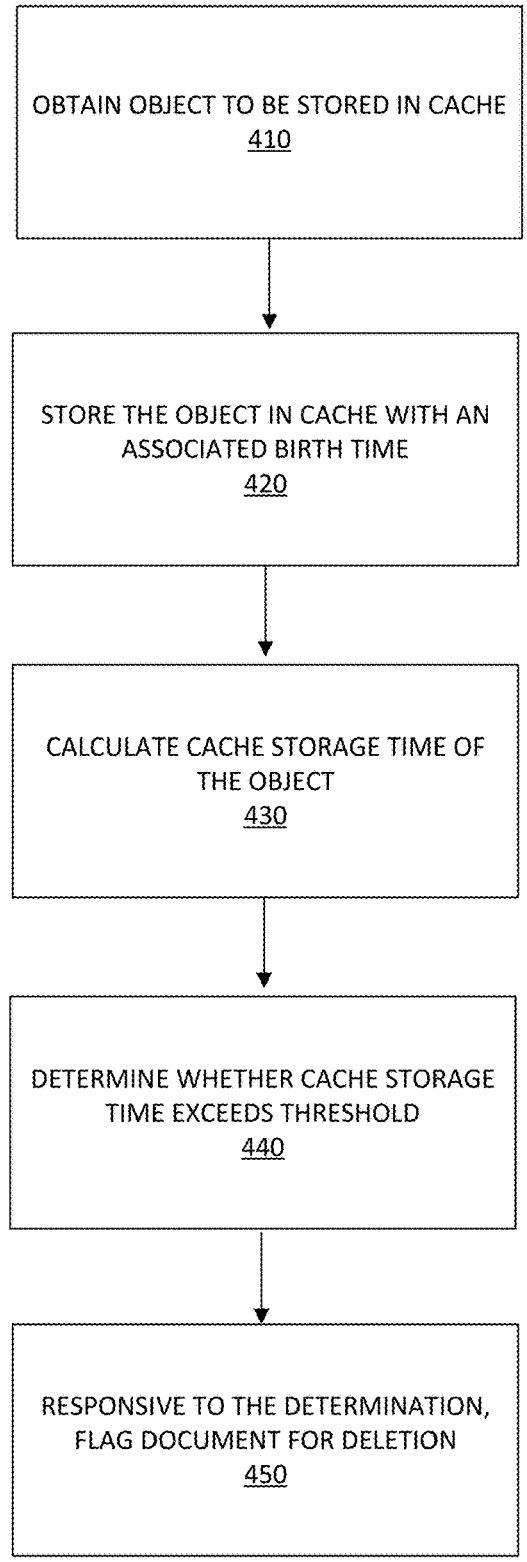
FIG. 4 depicts an example flow diagram of a method for birth time FIFO-based cache management, according to an embodiment.

FIG. 4 depicts a flow diagram of an example computer-implemented method 400 for birth time FIFO cache reaping. The method 400 may operate as a stand-alone method, and/or may operate in conjunction with embodiments of at least a portion of the data storage environment 100 and of any one or more components and/or devices related thereto, and/or with other systems, processors, databases and/or devices. For example, the workspace 110, including one or more of the applications 112, the cache manager module 114, the LTS I/O module 116, and the cache reaper module 118, may execute at least a portion of the method 400. In some embodiments, the one or more processors facilitating the workspace 110 may execute at least a portion of the method 400 in conjunction with one or more other components of the system 100, such as the client computer 140, and LTS system 130. Further, the method 400 may include additional or alternate steps other than those described with respect to FIG. 4 in embodiments.

The method 400 may include the one or more processors obtaining an object to be stored in a cache (such as the cache 120) (block 410). The one or more processors may obtain the object from an LTS system.

At block 420, the one or more processors store the object into the cache. In some aspects, the method 400 may include associating the object with a birth time at which the storage occurred. The birth time may remain constant as changes to the object are synchronized to the cache. In one aspect, the method 400 may include storing the birth time in object metadata in the cache. In one aspect, the method 400 may include modifying the object to indicate the birth time.

In one embodiment, the one or more processors may receive one or more modifications to the object and maintain the birth time as unchanged. In one embodiment, the one or more processors may retrieve a new version of the object from the LTS system based on authoritativeness and maintain the birth time as unchanged.

At block 430, the one or more processors calculate a cache storage time of the object based on the birth time of the object. Calculating the cache storage time may include subtracting the birth time of the object from a current time. In some aspects, the object metadata, including the birth time, is stored in a metadata storage (such as the metadata storage 124).

At block 440, the one or more processors determine whether the cache storage time exceeds a maximum cache storage threshold. The maximum cache storage threshold may indicate a duration of time that an object may remain in the cache, beyond which it is subject to deletion. In some aspects, the one or more processors detect a user input defining the maximum cache storage duration threshold. In some aspects, the one or more processors periodically compare the cache storage time to the threshold. In some aspects, the one or more processors determine an activity level associated with the cache and compare the cache storage time to the threshold when the activity level is below a threshold activity level.

At block 450 responsive to determining that the cache storage time of the object exceeds a maximum cache storage threshold, the one or more processors flag the object for deletion from the cache.

In one embodiment, responsive to determining that the object flagged for deletion has pending writes to an LTS system, the one or more processors queue the pending writes for synchronization with the LTS system. In some aspects, to determine that the object flagged for deletion has pending writes to the LTS system the one or more processors may determine a value for a write flag associated with the object.

In one embodiment, the one or more processors cause the pending writes to be written to the LTS system. In one embodiment, the one or more processors the object flagged for deletion to be deleted from the cache 120.

It should be understood that not all blocks of the method 400 are required to be performed. Moreover, the method 400 is not mutually exclusive (i.e., block(s) from method 400 may be performed in any particular implementation).

IV. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for identifying and grouping likely textual near-duplicates through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for cache management comprising:
   obtaining, via one or more processors, an object to be stored in a cache;
   storing, via the one or more processors, the object in the cache such that the object is associated with a birth time at which the storage occurred, wherein the birth time is constant as changes to the object are synchronized to the cache;
   calculating, via one or more processors, a cache storage time for the object based on the birth time for the object;
   determining, via the one or more processors, that the cache storage time for the object exceeds a maximum cache storage threshold;
   responsive to the determination, flagging, via the one or more processors, the object for deletion from the cache; and
   responsive to determining, via the one or more processors, that the object flagged for deletion has pending writes to a long-term storage (LTS) system, queueing, via the one or more processors, the pending writes for synchronization with the LTS system.

2. The computer-implemented method of claim 1, wherein determining that the object flagged for deletion has the pending writes to the LTS system comprises:
   determining, via the one or more processors, a value for a write flag associated with the object.

3. The computer-implemented method of claim 1, wherein determining that the object exceeds the maximum cache storage threshold comprises:
   periodically comparing, via the one or more processors, the cache storage time to the maximum cache storage threshold.

4. The computer-implemented method of claim 1, wherein determining that the object exceeds the maximum cache storage threshold comprises:
   determining, via the one or more processors, an activity level associated with the cache; and
   comparing, via the one or more processors, the cache storage time to the maximum cache storage threshold when the activity level is below a threshold activity level.

5. The computer-implemented method of claim 1, further comprising:
   detecting, via the one or more processors, a user input defining the maximum cache storage threshold.

6. The computer-implemented method of claim 1, wherein associating the object with the birth time comprises:
   storing, via the one or more processors, the birth time in object metadata in the cache.

7. The computer-implemented method of claim 1, wherein associating the object with the birth time comprises:
   modifying, via the one or more processors, the object to indicate the birth time.

8. The computer-implemented method of claim 1, further comprising:
   causing, via the one or more processors, the object flagged for deletion to be deleted from the cache.

9. The computer-implemented method of claim 1, further comprising:
   receiving, via the one or more processors, one or more modifications to the object; and
   maintaining, via the one or more processors, the birth time as unchanged.

10. A cache management system comprising:
   a cache;
   one or more processors; and
   one or more non-transitory memories coupled to the one or more processors and storing instructions that when executed by the one or more processors, cause the one or more processors to:
      obtain an object to be stored in a cache;
      store the object in the cache such that the object is associated with a birth time at which the storage occurred, wherein the birth time is constant as changes to the object are synchronized to the cache;
      calculate a cache storage time for the object based on the birth time for the object;

determine that the cache storage time for the object exceeds a maximum cache storage threshold;

responsive to the determination, flag the object for deletion from the cache; and responsive to determining that the object flagged for deletion has pending writes to a long-term storage (LTS) system, queue the pending writes for synchronization with the LTS system.

11. The cache management system of claim 10, wherein determining that the object flagged for deletion has the pending writes to the LTS system comprises:

determining a value for a write flag associated with the object.

12. The cache management system of claim 10, wherein determining that the object exceeds the maximum cache storage threshold comprises:

periodically comparing the cache storage time to the maximum cache storage threshold.

13. The cache management system of claim 10, wherein determining that the object exceeds the maximum cache storage threshold comprises:

determining an activity level associated with the cache; and comparing the cache storage time to the maximum cache storage threshold when the activity level is below a threshold activity level.

14. The cache management system of claim 10, wherein the instructions further cause the one or more processors to:

detect a user input defining the maximum cache storage threshold.

15. The cache management system of claim 10, wherein associating the object with the birth time comprises:

storing the birth time in object metadata in the cache.

16. The cache management system of claim 10, wherein associating the object with the birth time comprises:

modifying, via the one or more processors, the object to indicate the birth time.

17. The cache management system of claim 10, wherein the instructions further cause the one or more processors to:

cause the object flagged for deletion to be deleted from the cache.

18. The cache management system of claim 10, wherein the instructions further cause the one or more processors to:

receive one or more modifications to the object; and maintain the birth time as the time at which the storage occurred.

\* \* \* \* \*